May 3, 1955 R. T. GABLER 2,707,752
TRANSISTOR MULTIVIBRATOR
Filed March 3, 1950
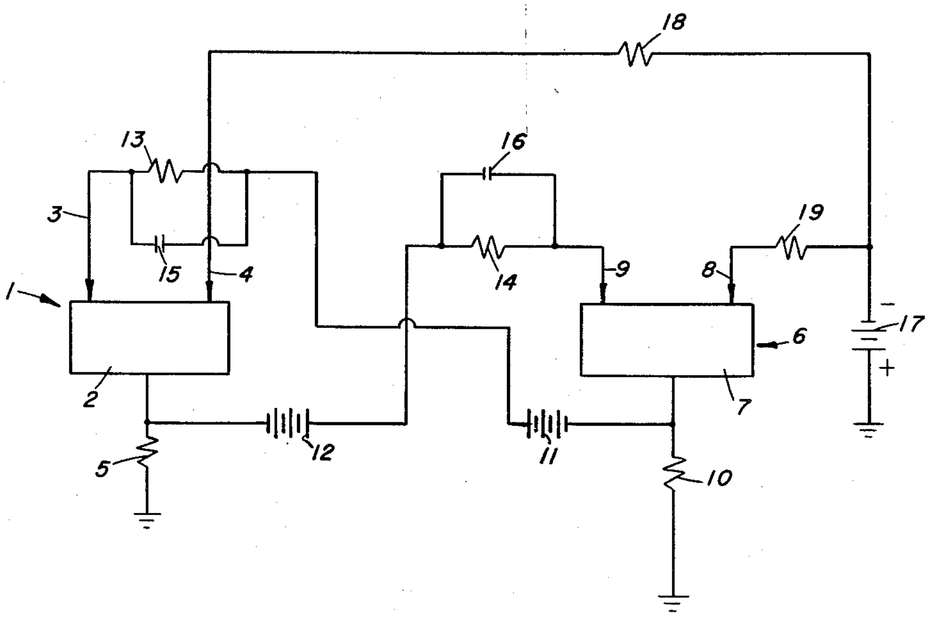
INVENTOR.
RAYMOND T. GABLER
BY William R. Lane
ATTORNEY United States Patent Office 2,707,752

Patented May 3, 1955

2,707,752

TRANSISTOR MULTIVIBRATOR

Raymond T. Gabler, Los Angeles, Calif., assignor to North American Aviation, Inc.

Application March 3, 1950, Serial No. 147,533

5 Claims. (Cl. 250—36)

This invention pertains to fast wave form generation, and particularly to a fast wave form generator having one or two stable states and employing transistors as circuit elements.

A well-known circuit usually employed for generating fast wave forms is known as the "Eccles-Jordan Circuit" and involves the use of two high vacuum triodes which are caused to conduct alternatively by the application of "triggering" pulses to various points in the circuit. This circuit may be arranged to be in a stable state when either triode is conducting, in which case the circuit is said to be bistable. Alternatively, the circuit elements may be so chosen in value that the circuit is stable in operation only when a preselected one of the two triodes is conducting. The circuit is then described as being monostable.

The present invention contemplates an analogy to the Eccles-Jordan circuit, capable of performing functions similar to those performed by the Eccles-Jordan circuit without the use of high-vacuum triodes with their attendant relatively high power consumption. One of the principal uses of bistable multivibrators or flip-flops and other fast wave form generators is in computers. In this connection, great numbers of bistable or monostable multivibrators may be used in a single computing device. If conventional high-vacuum triodes are used, a cumbersome and expensive power supply must be provided to supply current to the filaments of all the high-vacuum triodes. In addition, some provision must be made for eliminating the heat generated by the filaments of these triodes in order to prevent deterioration of these and other nearby circuit elements.

The transistor, having no filament drain and comparatively low heat dissipation to take into account, is utilized in this invention in an arrangement calculated to perform the same functions as other monostable and bistable multivibrators.

It is therefore an object of this invention to provide a multivibrator employing transistors as circuit elements.

It is another object of this invention to provide a multivibrator adapted to be bistable or monostable by a simple substitution of circuit component values.

It is a further object of this invention to provide a multivibrator having one or two stable states and employing transistors as circuit elements to reduce power supply requirements.

A still further object of this invention is to provide a continuous or free-running multivibrator which does not require triggering impulses.

Other objects of invention will become apparent from the following description taken in connection with the accompanying single figure which is a circuit diagram of the invention.

Referring to the single figure, a transistor 1 having a base 2, an emitter 3 and a collector 4, is connected from its base to ground by a resistor 5. A second transistor 6 having a base 7, a collector 8 and an emitter 9 is connected from its base to ground by a resistance 10.

A battery 11 is connected from base 7 to emitter 3 through resistor 13, and a battery 12 is connected from base 2 to emitter 9 through resistance 14. Condensers 15 and 16 parallel resistors 13 and 14, respectively. Collectors 4 and 8 are connected to battery 17 via resistors 18 and 19, battery 17 being connected, in turn, to ground.

In transistor 1 the current flowing in base resistor 5 is made up of the algebraic sum of three components: the emitter current of transistor 6, the collector current of transistor 1 and the emitter current of transistor 1. Under ordinary operating conditions the collector current of transistor 1 is the major component, and since the emitter currents flow in opposite directions it is permissible, for a first approximation, to neglect the effect of emitter current on the voltage drop through resistor 5. A similar situation exists for a voltage drop in resistor 10. To show that a regenerative condition permitting bistable multivibrator action exists, one can assume that both transistors are identical and that there is some point of stable or unstable equilibrium when current and voltages in the two transistors are identical, since perfect symmetry throughout the circuit can be assumed. From this starting point it can be assumed that some disturbance causes the current in the emitter of transistor 1 to have a positive increment. Through the normal amplifying properties of the transistors this results in an increment in the collector current of transistor 1, causing as a result of change of current in resistance 5 a drop in the potential of the emitter of transistor 6. Through the control action of transistor 6 a drop in its emitter potential and current will result in a decrease of its collector current, and hence in the current flowing through resistance 10. A decrease of current in resistance 10 results in an increase in the potential of the emitter of transistor 1 because of the circuit connection shown in the figure. Since an initial positive increment in the current of the emitter of transistor 1 was originally assumed it can be seen that the circuit connection results in a regenerative action which will drive the emitter of transistor 1 still more positive and the emitter of transistor 6 still more negative until one extreme point of stable equilibrium is reached. In a similar manner, a disturbance of one of the assumed initial conditions in the opposite direction results in driving the emitter and collector currents of the two transistors to the opposite extreme equilibrium position.

Although the said disturbance of assumed initial equilibrium conditions may be provided by applying triggering pulses of the proper polarity to any of the transistor electrodes, one practical arrangement is to apply triggering pulses to the base electrode. If a positive pulse is applied to base 2 of transistor 1, it can be seen that the bistable multivibrator is set in one direction or condition of stable equilibrium; and if a positive pulse is applied to base 7 of transistor 6 the circuit is set in the opposite direction or condition of stable equilibrium. Various combinations of positive and of negative pulses may be applied to various electrodes to accomplish a great variety of results or schemes of triggering, as is well known in the art. Condensers 15 and 16, placed in parallel arrangement with resistances 13 and 14, are used for the purpose of improving operation of the device by compensation for the effect of inherent capacity between the base electrodes and ground. However, if one of these condensers is made considerably larger than the effective capacity between the base electrodes and ground, and the paralleling resistances are made sufficiently large, operation of the device is modified so as to be analogous to that of a conventional one-shot multivibrator or monostable multivibrator in that the device then has only one stable state. When the coupling resistors are removed entirely and coupling capacitors of a value at least an order of magnitude greater than the interelectrode capacitors are used, the circuit will operate as a free-running or continuous multivibrator. The device has the advantage of employing no conventional vacuum tubes, thus eliminating the relatively high power requirements of vacuum tubes. In a similar manner, the heat produced by conventional vacuum tubes is eliminated. In addition, since transistors are physically much smaller than vacuum tubes, an enormous saving in weight and space is effected by this device.

Following are values of circuit elements of the device, it being understood that these are by way of example only:

| Circuit element: | Value |
|---|---|
| 5 | 10,000 ohms. |
| 10 | 10,000 ohms. |
| 11 | 1 volt. |
| 12 | 1 volt. |
| 13 | such as to limit emitter current to |
| 14 | about 10 milliamperes. |
| 15 | equal to base-ground capacitance |
| 16 | of transistor. |
| 17 | 30 volts. |
| 18 | 10,000 ohms. |
| 19 | 10,000 ohms. |

Capacitances 15 and 16 should be of the same order of magnitude as the base-to-ground capacitances of the transistors for bistable multivibrator operation. To achieve monostable operation, one of these should be made approximately an order of magnitude larger, and the accompanying resistor made sufficiently large or removed. Resistors 13 and 14 are current-limiting resistors for the protection of the transistors and should be adjusted for an emitter current in the neighborhood of 10 milliamperes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A multivibrator comprising two transistors each having a base electrode, a collector electrode and an emitter electrode, a source of electromotive force and a resistance connected in series between the base electrode of the first of said transistors and the emitter electrode of the second of said transistors, a source of electromotive force and a resistance connected in series between the base electrode of said second transistor and the emitter electrode of said first transistor, said base electrode being connected to the negative terminals of said sources of electromotive force, a third source of electromotive force, a resistance for connecting the negative terminal of said third source of electromotive force to the collector electrode of said first transistor, and a resistance for connecting the negative terminal of said third source of electromotive force to the collector electrode of said second transistor, a resistance for connecting the base electrode of said first transistor to the positive terminal of said third source of electromotive force, and a resistance for connecting the base electrode of said second transistor to the positive terminal of said third source of electromotive force whereby the current flowing in each of said base electrodes is dependent upon the current flowing in the other of said base electrodes and an externally impressed disturbance of the current flowing in one of said base electrodes may cause a rapid change in the current flowing in the other of said base electrodes.

2. A multivibrator comprising two transistors each having a base electrode, a collector electrode and an emitter electrode, a source of electromotive force and a resistance connected in series between the base electrode of the first of said transistors and the emitter electrode of the second of said transistors, a first capacitor connected in parallel with said last-named resistance, a source of electromotive force and a resistance connected in series between the base electrode of said second transistor and the emitter electrode of said first transistor, a second capacitor connected in parallel with said last-named resistance, said base electrodes being connected to the negative terminals of said sources of electromotive force, a third source of electromotive force, a resistance for connecting the negative terminal of said third source of electromotive force to the collector electrode of said first transistor, a resistance for connecting the negative terminal of said third source of electromotive force to the collector electrode of said second transistor, a resistance for connecting the base electrode of said first transistor to the positive terminal of said third source of electromotive force, and a resistance for connecting the base electrode of said second transistor to the positive terminal of said third source of electromotive force whereby, whereas current is flowing principally in only one of said transistors at a time, the introduction of a predetermined current upon any of said electrodes in opposition to the existing steady state current tends to reverse the condition of current flow so as to create a condition complementary to the condition originally obtained, thus increasing the current flowing in the second of said transistors to a steady state maximum and decreasing the current flowing in the first of said transistors to a steady state minimum.

3. A device as recited in claim 2 in which said first-named capacitor is an order of magnitude or more larger than said second-named capacitor whereby said multivibrator has but one stable state.

4. A multivibrator comprising a first and second transistor each having a base electrode, a collector electrode and an emitter electrode; means including a resistance and a capacitance connected in parallel and a source of electromotive force for producing an electrical current from the base electrode of said second transistor to the emitter electrode of said first transistor; means including a resistance and a capacitance connected in parallel and a source of electromotive force for producing an electrical current from the base electrode of said first transistor to the emitter electrode of said second transistor; and means including a resistance connected to each of the collectors of said transistors, a resistance connected to each of said base electrodes and a source of electromotive force for producing an electrical current from said collector electrodes to said base electrodes whereby if current is flowing at a maximum rate through one of said transistors from its base electrode to its collector electrode and at a minimum rate through the other of said transistors from its base electrode to its collector electrode, an externally originating electrical pulse applied to the base electrode of said first transistor in the sense required to decrease current therein causes the current to flow at a minimum rate in said first transistor and at a maximum rate in said second transistor.

5. A device as recited in claim 4 in which said capacitance connected to the emitter electrode of said first transistor is an order of magnitude larger than the said capacitance connected to said emitter of said second transistor whereby when no externally originating pulses are being applied to any of said electrodes, current always flows at a maximum rate in said first transistor and at a minimum rate in said second transistor.

References Cited in the file of this patent

UNITED STATES PATENTS

| | | |
|---|---|---|
| 2,416,201 | Nagel et al. | Feb. 18, 1947 |
| 2,531,076 | Moore | Nov. 21, 1950 |
| 2,533,001 | Eberhard | Dec. 5, 1950 |

(Other references on following page)

OTHER REFERENCES

"Some Novel Circuits for the Three Terminal Semiconductor Amplifier," by Webster et al., RCA Review, pages 5 to 16, March 1949.

"The Transistor Semi-Conductor Triode," by Bardeen et al. Physical Review, pages 230 to 233, July 15, 1948.

"Microwaves and Radar Electronics," by Pollard and Sturtevant, pub. by Wiley and Sons, New York, 1948, pages 306 and 307.